United States Patent
Kuklok

(10) Patent No.: US 8,162,367 B2
(45) Date of Patent: Apr. 24, 2012

(54) RACK WITH RETRACTABLE DRAWERS FOR THE BED OF A PICK-UP TRUCK

(76) Inventor: Dale Raymond Kuklok, Sauk Rapids, MN (US)

( * ) Notice: Subject to any disclaimer, the term of this patent is extended or adjusted under 35 U.S.C. 154(b) by 0 days.

(21) Appl. No.: 12/782,760

(22) Filed: May 19, 2010

(65) Prior Publication Data

US 2011/0285162 A1  Nov. 24, 2011

(51) Int. Cl.
*B60R 9/042* (2006.01)
*B60P 3/00* (2006.01)

(52) U.S. Cl. ............................. 296/3; 296/37.6; 224/405

(58) Field of Classification Search ........... 296/3, 26.03, 296/26.13, 37.6, 26.09, 186.1; 224/403–405
See application file for complete search history.

(56) References Cited

U.S. PATENT DOCUMENTS

| | | | |
|---|---|---|---|
| 4,522,326 A * | 6/1985 | Tuohy, III | 224/310 |
| 4,830,421 A * | 5/1989 | Hawelka et al. | 296/24.45 |
| 5,102,180 A * | 4/1992 | Finley | 296/37.6 |
| 5,423,587 A * | 6/1995 | Ingram | 296/3 |
| 5,518,288 A * | 5/1996 | Deklotz | 296/26.06 |
| 6,347,731 B1* | 2/2002 | Burger | 224/405 |
| 6,814,384 B2* | 11/2004 | Grafton | 296/37.6 |
| 2011/0186610 A1* | 8/2011 | Russo | 224/405 |

* cited by examiner

*Primary Examiner* — Dennis Pedder
(74) *Attorney, Agent, or Firm* — Albert W. Watkins

(57) ABSTRACT

A rack with retractable drawers for the bed of a pick-up includes a rack adapted to be supported by the side wall; a drawer brace held by the rack above the truck bed; and a drawer attached to the drawer brace. The drawer extends from and retracts into the rack so as to be accessible from outside of the truck bed. One or more drawers may extend out the sides of the pickup or out the tail gate area.

9 Claims, 4 Drawing Sheets

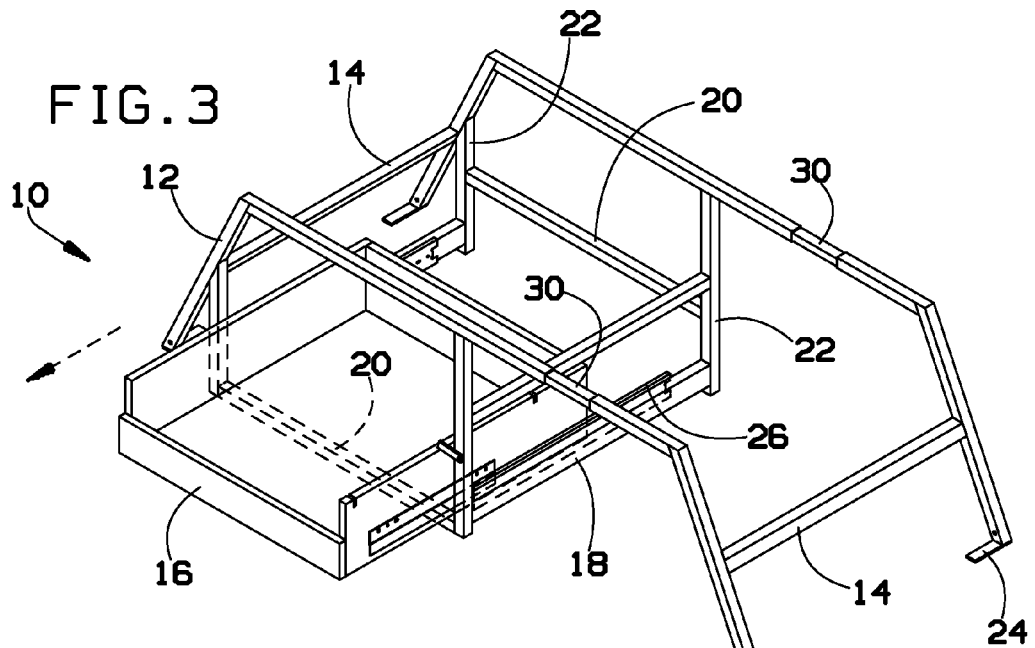
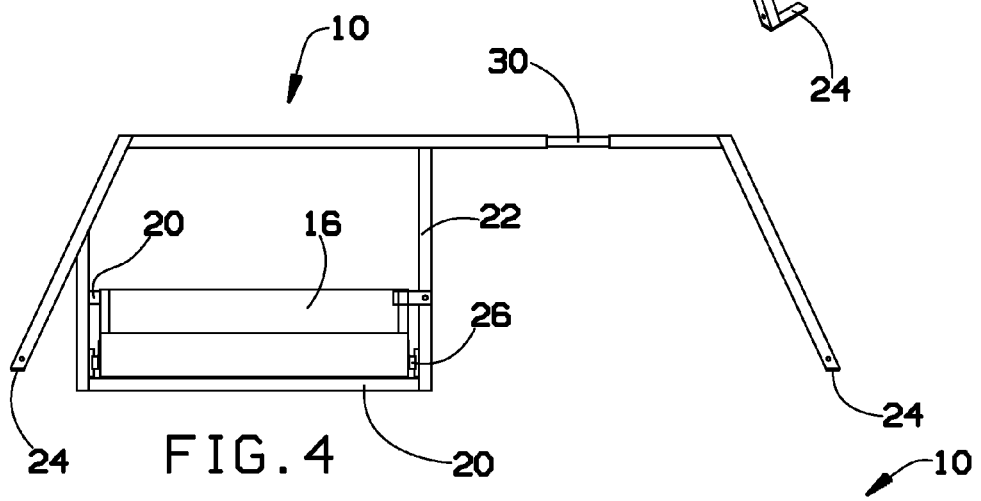
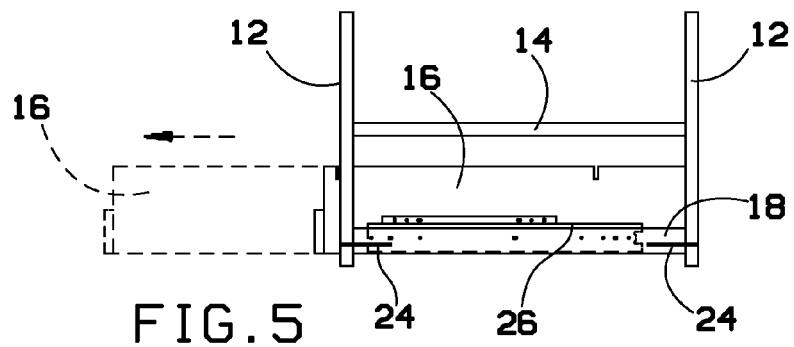

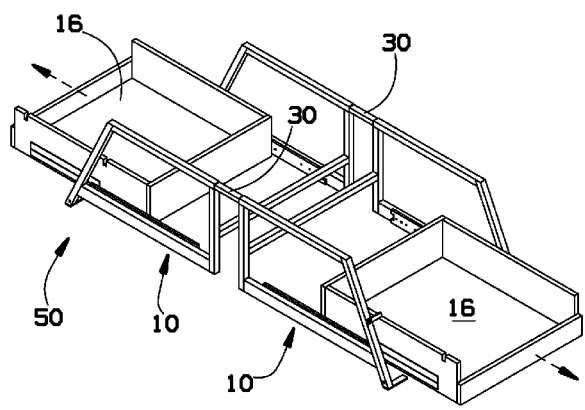
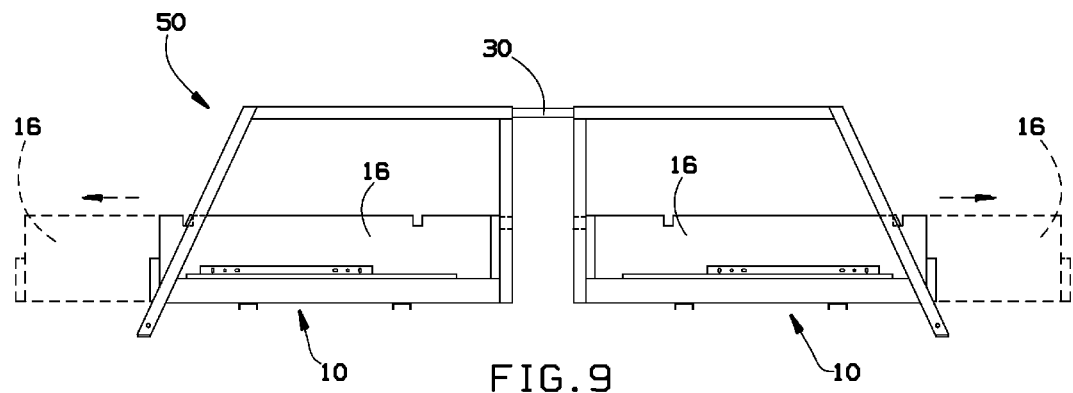

RACK WITH RETRACTABLE DRAWERS FOR THE BED OF A PICK-UP TRUCK

BACKGROUND OF THE INVENTION

The present invention generally relates to truck accessories, and more specifically, to a rack with retractable drawers for the bed of a pick-up truck.

Current drawers for trucks take up the entire bed, and may be limited in what they can contain.

As can be seen, there is a need for a rack with drawers for trucks that can be easily removed.

SUMMARY OF THE INVENTION

In one aspect of the present invention, a device for a truck having a bed with a side wall includes: a rack adapted to be supported by the side wall; a drawer brace held by the rack above the truck bed; and a drawer attached to the drawer brace; wherein the drawer extends from and retracts into the rack so as to be accessible from outside of the truck bed.

In another aspect of the present invention, a storage device for a pickup truck having a bed with a side wall includes: a rack adapted to be supported by the side wall and to fit within a topper of the truck bed; a drawer brace held by the rack above the truck bed; a drawer attached to the drawer brace; and a plurality of legs adapted to support the rack so that the drawer is held above the truck bed.

These and other features, aspects and advantages of the present invention will become better understood with reference to the following drawings, description and claims.

BRIEF DESCRIPTION OF THE DRAWINGS

FIG. 3 depicts the embodiment of FIG. 1 with the drawer slid out;

FIG. 4 depicts a front view of the embodiment of FIG. 1;

FIG. 5 depicts a side view of the embodiment of FIG. 1;

FIG. 8 depicts the embodiment of FIG. 6 with the drawers slid out; and

FIG. 9 depicts a front view of the embodiment of FIG. 6.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention generally provides a rack with retractable drawers suspended over the bed of a pick-up truck on the side walls or rails of the truck bed box.

Embodiments of the present invention may congregate all tools and supplies in one place, and keep them secure so that they are not damaged or lost. The tools may be accessible from outside the truck box using a retractable drawer system.

An embodiment of a storage rack may be suspended above the bed of a pick-up truck supported on the side walls or rails of the bed box. This configuration may keep the bed clear of obstacles and miscellaneous materials so that other items can be easily loaded and unloaded.

Figure 1:
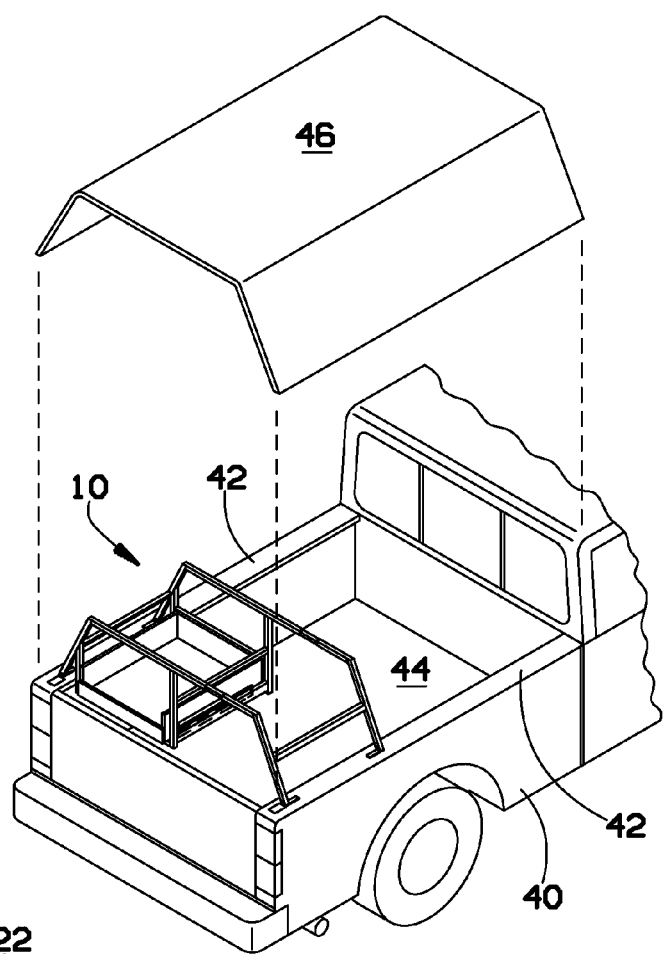
FIG. 1 depicts an embodiment of the present invention used with a pickup truck.

As depicted in FIG. 1, an embodiment of the present invention may include a rack 10 to allow a human person to contain and access items from outside the box of a pick-up truck 40. A rack 10 may be supported by both side walls 42 of the box of the truck 40, to lift the rack 10 above the bed 44 of the pick truck box. Embodiments of a rack 10 may fit inside a topper 46 (cap or shell) of the truck 40, protected from the elements such as rain or snow.

Figure 2:
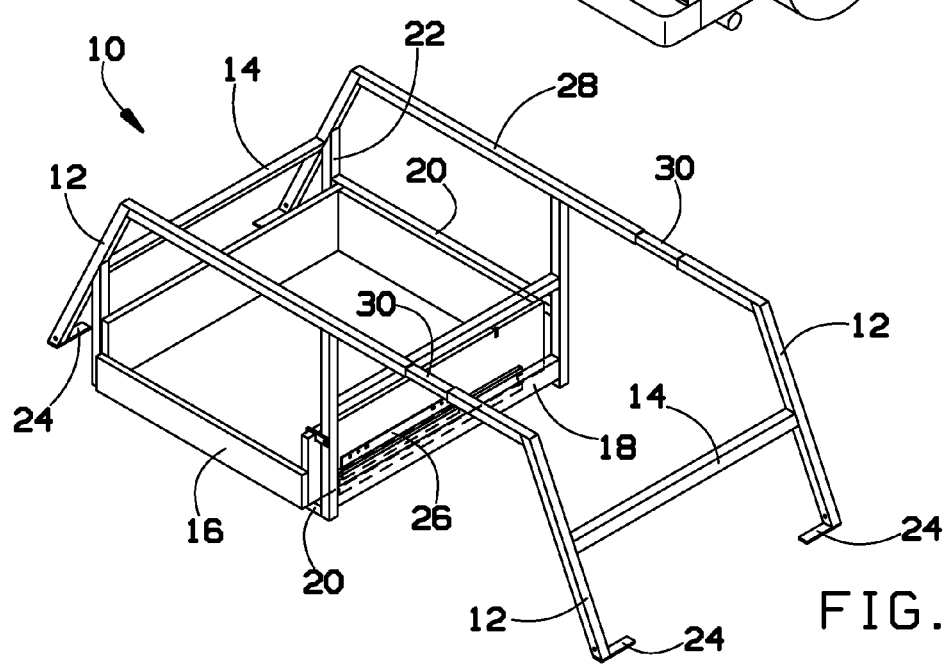
FIG. 2 depicts a perspective view of the embodiment of FIG. 1.

As depicted in FIG. 2, an embodiment of the present invention may include a rack 10 having legs 12 to support the rack 10 above the bed of the pick-up truck box on the side walls of the box of the truck. Frame supports 28 may separate the legs 12 and maintain support for the rack 10 over the bed or box of the truck. One or more leg braces 14 may spread the legs 12 and frame supports 28 as a unit and provide rigidity. An embodiment of the rack 10 may be adjustable to fit truck box widths in a range of, for example, 40"-78".

An embodiment may include a rack 10 to accommodate one or more drawers 16 supported by drawer supports 22 attached to the frame supports 28 and legs 12. The drawer supports 22 may be separated by drawer spreaders 20 which work in conjunction with drawer braces 18. The rack 10 may be adjustable for height by leg adjusters 24. The adjusters 24 may adjust the height of the rack 10 above the bed of the truck box from, for example, 0.5" to 6". The rack 10 may comprise metal, square and rectangular tubing ranging in size from, for example, 0.75"-2" and other metal components to complete the rack 10. The drawer 16 may fit within the rack 10 surrounded by the drawer support 22, drawer brace 18 and drawer support spreader 20. The drawer 16 may be mounted to the drawer brace 18 using a drawer slide 26, and the appropriate metal fastening items. The slide may allow the drawer 16 to be extended and retracted from the rack 10. The drawer 16 may be locked in the extended or retracted position by a drawer lock. This action allows the person to remain outside the box of the truck, extend the drawer 16, access the contents of the drawer 16, and then retract it into the rack 10. This action can be accomplished from either the side of the truck or the back of the truck at the tail gate. The drawer 16 may comprise any hard, supportive material known in the art, including but not limited to wood, metal and plastic. The drawer 16 may be shaped as a square or rectangle.

As depicts in FIGS. 3, 4, and 5, an embodiment of a rack 10 may include a drawer 16 that slides in and out. The drawer 16 may have a bottom 22"-27" by 20"-29" with (4) sides 3"-8" in height. The drawer 16 may contain items for the person elevated above the bed of the truck box, leaving space to contain other larger items that are less likely to be scattered about and hard to retrieve without the person climbing into the box of the truck.

In an embodiment, the legs 12 may be connected to the frame support 28 above the drawer support 22, and the legs may be spread apart for width by the drawer support spreader 20 and leg brace 14. Connections may be performed by welding or other attachment mechanisms. The legs 12 may be welded to the frame support 28 at an angle, and typically a 110-120 degree angle. The leg brace 14 and drawer support spreader 20 may be welded to the legs and frame support 28 at 90 degree angles. The drawer 16 may be connected to the drawer brace 18 by metal and wood screws. The drawer 16 may be assembled preferably with glue and staples.

In an embodiment, the rack 10 may be suspended over the bed of a pickup truck. Within the rack 10 may be 1-2 drawers 16 mounted on drawer slides 26 allowing the drawer 16 to be extended or retracted in or out of the rack.

Figure 6:
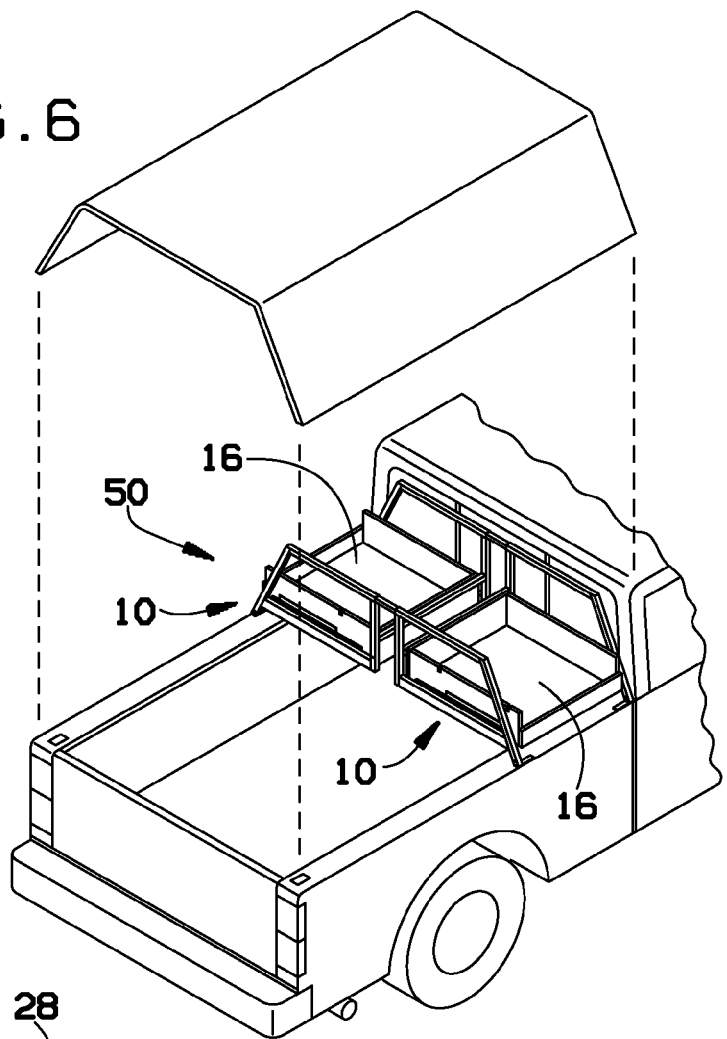
FIG. 6 depicts a second embodiment of the present invention used with a pickup truck.

As depicted in FIG. 6, an alternate embodiment of the present invention may include a rack system 50 for a pick-up truck 40 supported by the truck side walls 42 to lift two racks 10 above the truck bed 44. Embodiments of a rack system 50 include a storage device that may fit inside a truck topper 46.

Figure 7:
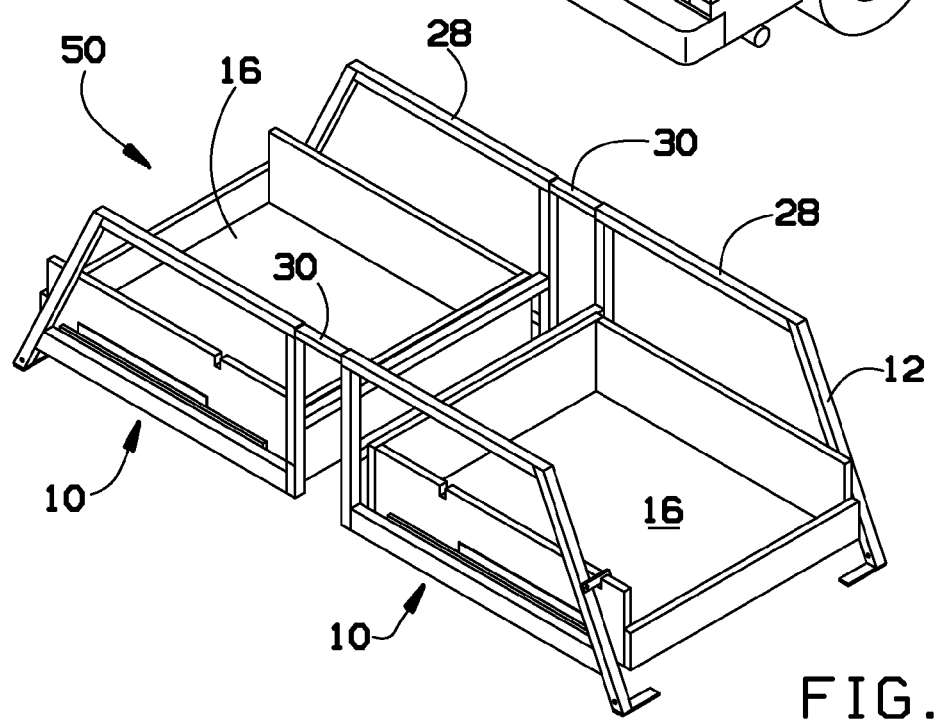
FIG. 7 depicts a perspective view of the embodiment of FIG. 6.

As depicted in FIG. 7, an embodiment of a rack system 50 may include two racks 10, each with legs 12, slidable drawers 16, and frame supports 28. The rack system 50 may be supported by opposing side walls of the truck bed. The drawers may extend out the sides of the pickup.

In an embodiment, the person in the cab of the truck may be protected from the contents of the drawer by a head bump screen attached to the rack on the cab side of the rack.

An embodiment may provide a convenient way to secure and access items from outside the pick-up truck box. All the items remain contained under the truck topper yet elevated above the box of the truck in the rack. The person standing by the side of the pick-up truck may swing the wing window of the topper (cap or shell) open, allowing access to the rack. From the back of the pick-up truck, the person standing at the rear of the truck could open the back window of the topper (cap) and have access to the rack. Extending the drawer(s) over the rear end of the truck gives full access to the contents. The drawer(s) may be retracted into the rack under the truck topper for protection and safe travel. The human person no longer needs to crawl up into the box of the pick-up truck to search for the item desired.

It should be understood, of course, that the foregoing relates to exemplary embodiments of the invention and that modifications may be made without departing from the spirit and scope of the invention as set forth in the following claims.

I claim:

1. A rack with at least one retractable drawer adapted to be supported by a truck having a bed with side walls, comprising:
   a plurality of frame supports extending transversely to said truck bed and generally between said truck side walls;
   a plurality of drawer supports hanging beneath and from said plurality of frame supports;
   a plurality of drawer braces suspended from said plurality of drawer supports above said truck bed; and
   at least one drawer attached to said plurality of drawer braces; and
   a plurality of legs adapted to support said plurality of frame supports upon said truck side walls so that said drawer is held above said truck bed;
   wherein said legs are angled outward from 110 degrees to 120 degrees relative to said plurality of frame supports and wherein said drawer extends from and retracts into said rack so as to be accessible from outside of said truck bed.

2. The rack of claim 1, wherein said rack is adapted to fit within a topper of said truck bed so that said drawer extends from and retracts into said topper.

3. The rack of claim 1, wherein said plurality of legs are adapted to support said rack upon said side walls.

4. The rack of claim 1, wherein said frame supports are adjustable to fit varying truck box widths.

5. The rack of claim 1, further comprising:
   a second plurality of frame supports extending transversely to said truck bed and generally between said truck side walls;
   said second plurality of frame supports are adjustable to fit varying truck box widths;
   a second plurality of drawer supports hanging beneath and from said second plurality of frame supports;
   a second plurality of drawer braces suspended from said second plurality of drawer supports above said truck bed; and
   at least a second drawer attached to said second plurality of drawer braces; and
   a second plurality of legs adapted to support said second plurality of frame supports upon said truck side walls so that said second drawer is held above said truck bed;
   wherein said second plurality of legs are angled outward from 110 degrees to 120 degrees relative to said second plurality of frame supports and wherein said second drawer extends from and retracts into said rack so as to be accessible from outside of said truck bed.

6. The rack of claim 1, wherein said plurality of frame supports comprise first and second frame support tubes, and said plurality of drawer supports comprise a first drawer support tube affixed to and extending vertically downward from a first one of said plurality of legs, a second drawer support tube affixed to and extending vertically downward from a second one of said plurality of legs, a third drawer support tube affixed to and extending vertically downward from said first frame support tube, and a fourth drawer support tube affixed to and extending vertically downward from said second frame support tube.

7. The rack of claim 6, wherein a first one of said plurality of drawer braces is affixed to and extends between said first drawer support tube and said second drawer support tube, and a second one of said plurality of drawer braces is affixed to and extends between said third drawer support tube and said fourth drawer support tube.

8. The rack of claim 7, wherein said first and second ones of said plurality of drawer braces extend longitudinally parallel to said first and second frame support tubes.

9. The rack of claim 7, wherein said first and second ones of said plurality of drawer braces extend longitudinally perpendicular to said first and second frame support tubes.

\* \* \* \* \*